(12) United States Patent
Eberle et al.

(10) Patent No.: US 8,172,267 B2
(45) Date of Patent: May 8, 2012

(54) METHOD AND BELT TENSIONING SYSTEM FOR RESTRAINING PASSENGERS OF A VEHICLE UPON IMPACT WITH AN OBSTACLE

(75) Inventors: Walter Eberle, Hochdorf (DE); Till Heinrich, Stuttgart (DE); Christian Mayer, Ditzingen (DE)

(73) Assignee: Daimler AG, Stuttgart (DE)

( * ) Notice: Subject to any disclaimer, the term of this patent is extended or adjusted under 35 U.S.C. 154(b) by 293 days.

(21) Appl. No.: 12/520,691

(22) PCT Filed: Oct. 2, 2007

(86) PCT No.: PCT/EP2007/008550
§ 371 (c)(1), (2), (4) Date: Dec. 2, 2009

(87) PCT Pub. No.: WO2008/077442
PCT Pub. Date: Jul. 3, 2008

(65) Prior Publication Data
US 2010/0102617 A1   Apr. 29, 2010

(30) Foreign Application Priority Data
Dec. 23, 2006   (DE) .................. 10 2006 061 427

(51) Int. Cl.
*B60R 22/36* (2006.01)
(52) U.S. Cl. ....................................... 280/806
(58) Field of Classification Search ............ 280/806, 280/807; 297/474, 478, 480
See application file for complete search history.

(56) References Cited

U.S. PATENT DOCUMENTS

| 5,492,368 | A | 2/1996 | Pywell et al. |
| 6,139,111 | A | 10/2000 | Pywell et al. |
| 7,905,441 | B2 * | 3/2011 | Scherzinger et al. ......... 242/374 |
| 2003/0075907 | A1 | 4/2003 | Baumann et al. |
| 2003/0155801 | A1 | 8/2003 | Tatematsu et al. |
| 2004/0251675 | A1 * | 12/2004 | Herberg et al. ............... 280/806 |
| 2010/0156084 | A1 * | 6/2010 | Nezaki .......................... 280/806 |

FOREIGN PATENT DOCUMENTS

| DE | 2 409 943 | 9/1974 |
| DE | 25 43 068 A1 | 4/1976 |
| DE | 101 39 609 C1 | 8/2002 |
| DE | 10 2006 053 563 A1 | 5/2008 |

(Continued)

OTHER PUBLICATIONS

"Method of Reducing Injury in Side Vehicle Impacts and/or Rollovers" Research Disclosure, Mason Publications, Hampshire, Mar. 1, 1994, No. 359, XP000439936.

(Continued)

*Primary Examiner* — Faye M. Fleming
(74) *Attorney, Agent, or Firm* — Crowell & Moring LLP

(57) ABSTRACT

In a method and apparatus for restraining passengers in a retaining passengers in a vehicle upon impact with an obstacle, a possible accident is initially sensed. Thereafter, at the latest, whenever the vehicle first contacts the obstacle, or whenever vehicle deceleration exceeds a threshold, a force acting in the direction of impact is exerted upon the passenger via a seat belt system. The force is introduced by bilateral tensioning of a lap belt of a seat belt system, from both sides at a force of at least 2000-4500 N. The latter is maintained for a retaining phase of at least 20 ms along a displacement path of the passenger.

8 Claims, 4 Drawing Sheets

FOREIGN PATENT DOCUMENTS

| | | |
|---|---|---|
| EP | 1 344 697 A2 | 9/2003 |
| GB | 1 441 385 | 6/1976 |
| WO | WO 99/59848 A1 | 11/1999 |

OTHER PUBLICATIONS

German Search Report including partial English translation dated Mar. 20, 2007 (Nine (9) pages).

International Search Report including partial English translation dated Jan. 18, 2008 (Seven (7) pages).

Written Opinion including partial English translation (Nine (9) pages).

* cited by examiner

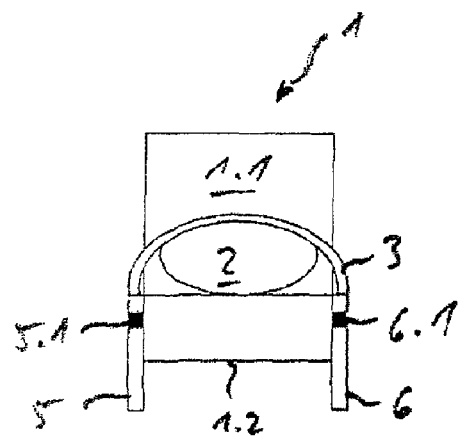
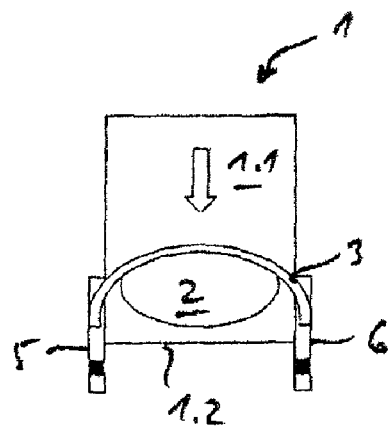
Fig. 1a
Fig. 1b
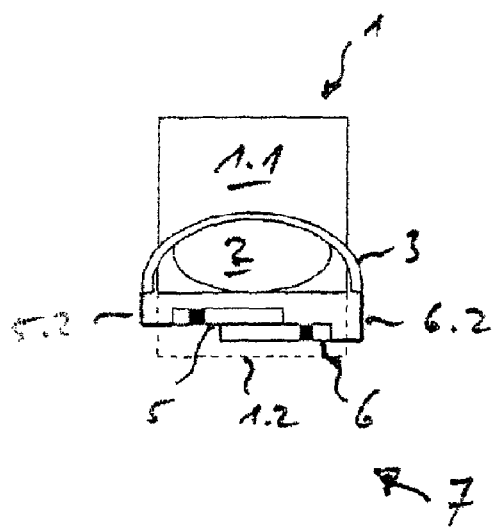
Fig. 2

METHOD AND BELT TENSIONING SYSTEM FOR RESTRAINING PASSENGERS OF A VEHICLE UPON IMPACT WITH AN OBSTACLE

BACKGROUND AND SUMMARY OF THE INVENTION

This application is a national stage of International Application No. PCT/EP/2007/008550, filed Oct. 2, 2007, which claims priority under 35 U.S.C. §119 to German Patent Application No. 10 2006 061 427.5, filed Dec. 23, 2006, the entire disclosure of which is herein expressly incorporated by reference.

The invention relates to a belt tensioning method and apparatus for restraining passengers of a vehicle.

German patent document DE 10139609 C1 discloses a method in which a possible or an actual accident is first sensed, such that a force can be applied to the vehicle passenger in good time (that is, at the latest, at the time of the first contact of the vehicle with an obstacle). This force acts with the impact direction, (the direction of the impact on the vehicle); thus a frontal impact, the direction is against the direction of travel. The force is applied to the passenger in such a manner that a constant (that is, even) force acts on the passenger over the entire brake path. When this is applied to a safety belt designed according to this method, removal of kinetic energy of the passenger is initiated early via by tightening belt slack, so that the passenger is delayed relative to the ground, even before a retaining effect is initiated through the safety belt system.

The known passive retaining action is initiated if the passenger is moved forward due to mass forces and is retained by the belt. A belt withdrawal block with force limitation normally acts then, which limits the load values on the chest. Energy can thus be removed over the entire brake path in an even manner, so that damaging acceleration peaks on the passenger are avoided. (The term "brake path" as used herein refers to the absolute path of the passenger in the vehicle, which is available for braking the passenger from the time of the first contact of the vehicle with the obstacle; it is thus composed of the dynamic total deformation of the vehicle and the possible pre-displacement path of the passenger within the passenger compartment.)

This method has the advantage that the restraint of the vehicle passenger starts early by a force applied thereto. The kinetic energy of the passenger can thus be reduced early, and the entire available path can be used. Unlike conventional retaining systems, no relative movement between the passenger and the vehicle needs be awaited, so that a retaining action is applied. The force can be applied to the vehicle passenger by several consecutively or simultaneously activated retaining systems. The force can also be applied corresponding to the impact direction by different retaining systems.

To increase passenger safety, a three point belt system is commonly provided for a normal vehicle seat with several belt tensioners, so that the belt slack in the belt system can be removed suddenly during an accident. The belt tensioners are designed so that the belt strap is applied to the body of the passenger in a tensioned manner, and without play, during an impact force, so that the passenger can take part in the vehicle deceleration as soon as possible. The retaining action is communicated by a belt withdrawal lock with force limitation. The known belt tensioners for removing the belt slack are not designed to exert a force on the passenger, which could effect an acceleration of the center of gravity.

The conventional pyrotechnic linear tensioners used in vehicles build up a force of 2-2.5 kN in a cylinder-piston unit within a time which is as short as possible (5-12 ms), which force is applied to retract the belt, and to remove its slack. The piston locks at the end of the tensioning path, so as to retain the passenger in the subsequent passive retaining phase, where he or she experiences a forward displacement, or to release the belt strap again against the resistance of a force limiting device, if present. With the locking of the piston, the pressure need not be maintained any more in the piston-cylinder unit. It is the trend that the tensioners reach the point of locking in a time that is as short as possible, so as to enter the locking then. The pressure in the piston-cylinder unit decreases quickly afterwards, so that the force limitation device can act in a defined manner in the belt withdrawal phase.

In German patent document DE 10139609 C1, the crash-conditional force peak is reduced in the belt strap by the delay of the center of gravity of the passenger brought forward relative to the ground, which is later used in the retaining phase. This method requires that high forces can be introduced via the safety belt system.

A safety belt system usually comprises a belt strap, which forms a lap belt between the belt end fitting and the belt lock. (The belt strap is deflected at the belt tongue, is guided to a deflector of a belt retractor arranged near the shoulder of a passenger, and forms the shoulder belt in the region between the belt lock and the deflector. The introduction of high forces by tensioning of the shoulder belt (e.g., by tensioning in the region of the belt retractor or at the belt lock) meets boundaries due to the limited pressure loading capacity of the chest region of the passenger. The high forces necessary for an acceleration of the passenger cannot be introduced at a sufficient height via the shoulder belt, especially as friction losses result by the deflection.

One object of the present invention is to improve the passenger protection afforded vehicle passenger restraint systems.

This and other objects and advantages are achieved by the method for retaining vehicle passengers and the belt tensioning system according to the invention, in which a possible accident is initially sensed, and a force acting in the direction of impact is exerted upon the passenger via a seat belt system, at the latest, whenever the first contact is made between the vehicle and the obstacle, or shortly thereafter (in particular, upon exceeding a threshold for vehicle deceleration). An improvement of 30% results already with a tensioning at the same time as with present-day vehicles, the ignition time for lock tensioners or the retractor tensioner; that is, shortly after the first contact with the obstacle, when the vehicle deceleration exceeds a threshold.

The activation of the safety belt system can also take place shortly before the impact in the sense of a pre-crash release, at the earliest, as soon as is known with certainty that the impact will take place. This is connected to a higher sensoric effort of a pre-crash sensor system.

The force is introduced by bilateral tensioning of a lap belt of a safety belt system, by tensioning from both sides with a force of typically 2000 N to 4500 N, and this force is maintained along a displacement path of the passenger over a period of at least 20 ms.

A bilateral tensioning of the lap belt is provided according to the invention, since the iliac wings of the passenger can receive much higher forces than the shoulder or chest of the passenger. The invention can be applied not only to three point safety belt systems, but also to safety belt systems which only have a lap belt or a separate lap belt.

The force exerted by early tensioning of the lap belt is decoupled from the delay pulse of the vehicle, which applies only with some delay in the full height due to the soft collapsible zones of present-day vehicles. A removal of kinetic energy of the passenger is initiated via the removal of belt slack, by delaying the passenger relative to the ground even before an inertia movement of the passenger caused by the impact can introduce a passive restraining action by the safety belt system. In other words: with a frontal impact, an acceleration pulse directed against the normal vehicle movement is impressed upon the passenger. The pulse or force entry is adjusted to the kinetic energy of the passenger, which is to be removed, with regard to duration and force level, wherein, as is known, the mass of the passenger and the vehicle speed are the significant magnitudes. The crash course (relative speed, crash gravity/the other party) to be expected enters the measurement as the available "brake path" for the passenger deceleration relative to the ground, as the use of the deformation path of the collapsible zone depends on the gravity of the accident.

The pulse initiation via the lap belt also offers an advantage in the kinematics of the upper body, as the pulse in the impact direction is forwarded to the upper body. The upper body is thereby accelerated in the impact direction, and immerses into the seat backrest and the seat cushion during this backward movement. The forward displacement of the upper body caused by the crash thus not only starts later, but a longer forward displacement path for the body, pelvis and head of the passenger is available.

It is an additional advantage that the passenger is drawn into the seat by the strength of the tensioning, whereby a longer forward displacement path is available for the passenger in the following passive retaining path. The need of a temporally longer tensioning requires that the tensioner provide a longer retraction path, which stands in good stead for a longer withdrawal path under the effect of a defined force limitation in the subsequent passive retaining phase, whereby a specific removal of kinetic energy of the passenger is possible.

It is a further advantage that all elasticities of the system (e.g., that of the belt strap or of the seat) are removed by the tensioning, so that a retaining path which is otherwise necessary for consuming elasticities, is omitted in the subsequent passive retaining phase and a longer retaining path is effectively available. A considerably earlier retention of the pelvis takes place via the seat cushion or other structural element of the seat, e.g., "anti-submarining" devices, seat wedges, etc.

A further embodiment of the method relates to a three point retaining system, where the belt strap is deflected at the belt tongue and is guided to a belt retractor arranged near the shoulder of a passenger, and where a third tensioner engages for introducing a force in the shoulder belt. According to the further embodiment, the belt strap section between the belt lock and the belt retractor (shoulder belt) is tensioned simultaneously with or before the lap belt, but the force introduced into the shoulder belt is limited to remove a belt slack. An optimum restraint of a passenger is possible with this combination of lap belt and shoulder belt tensioning, without the forces exerted by the tensioning systems exceeding the biomechanical loading capacity of the passenger. A reduction of the peak values is achieved compared to the present-day retaining systems.

In a further embodiment, specific control of the rearward displacement in the direction and acceleration can be achieved with the bilateral tensioning. The center of gravity of the passenger resulting in the direction of the seat backrest and/or seat cushion can for example be displaced by the bilateral tensioning with the same force of the lap belt during a frontal impact. One can for example react to a deviation of the impact region from the vehicle longitudinal direction e.g., during an oblique impact by a time delay in the tensioning of both sides.

Compared to the state of the art, the force in the lap belt is maintained at a high level of typically 2.0-4.5 kN over a sustained period between 20-100 ms before or at an early time after the start (t_0) of the crash. This requires a longer tensioning path, as the belt has to follow the retracting displacement and the reduction of the elasticities of the seat of the passenger.

The tensioners can have a pryotechnic release unit, which has the advantage that they can be released quickly, so that tensioning times are optimized, and passenger safety is increased considerably. But it is also possible to use other conventional release units, which have a pneumatic, hydraulic or electromotive drive. Mechanical drives using the stored energy of a compressed spring are also conceivable.

In an advantageous embodiment, the tensioners are formed with a cylinder-piston unit in a further development of linear tensioners of known construction. The first and second tensioner are linear drives with respectively one force transfer element, which is in operative connection with the belt lock or the end fitting. A longer tensioning path can be provided with an extension of the cylinder, a hollow cylinder, in which the piston is moved, to 100-150 mm, so that a total shortening of the lap belt by at least 200-300 mm can be achieved. So that the pressure in the cylinder-piston unit can be maintained over a longer period of 20-100 ms, sealing measures are usually necessary between piston, traction means and cylinder.

If the bilateral force introduction in the lap belt takes place by two independent tensioners (a first tensioner for the belt end fitting, and a second tensioner for the belt lock), the tensioning times, duration, and force levels of both tensioners can be adjusted independently, so that it can be reacted on the impact direction.

According to one embodiment, both tensioning systems are combined in a one-piece component, which can be integrated in the seat frame, for example, in a transverse traverse of the seat frame. This embodiment has the advantage that it can be completely preassembled, which has a positive effect on the assembly time.

The belt tensioning system—as one-piece or in several pieces—for tensioning the lap belt can be arranged under the seating area of the vehicle seat. Space is available there, so that integration of the tensioning system can be visually unobtrusive, and without loss of free space for the feet.

If both tensioners are arranged as transverse tensioners in a transverse manner under the seating area and are connected to the seat (e.g., by integration in a transverse traverse of the seat frame), it is possible to displace the seat together with the tensioning systems. In this manner, it is ensured that the tensioning systems always take up the same position relative to the belt end fitting and the belt lock, where the tensioning systems engage. Reliable functioning of the safety device is thus ensured. With an arrangement of the transverse tensioner between the seat adjustment rails of the seat, measures would have to be implemented to equalize a seat displacement in the length or the height.

In a preferred embodiment, both tensioners for the lap belt are integrated in a common seat-integrated component (in particular, the rear transverse traverse of the seat frame), and have a common release unit with a common working chamber, which is filled with gas under a high pressure when released by a common gas generator (e.g., a pyrotechnic ignition tablet).

In an advantageous further embodiment, the two working chambers of both tensioners are pneumatically connected to one another by an equalization, which volume ensures that the belt is retracted with the same force from both sides. The tensioners can be arranged in an axially offset manner in such a manner that both working chambers are aligned vertically. The two working chambers are then integrated into a common working chamber with the equalization volume, where the pressure build-up takes place. It is then also sensible to provide a common gas generator for the gas flow into the equalization volume. Only an ignition pill is thus necessary for a bilateral tensioning.

A connection element (especially a traction element) can be provided between the belt end fitting of the belt strap and the release unit, preferably in the form of a wire rope. Such a rope can transfer the traction forces reliably, which introduces the release unit into the connection element. Any other type of connection element which fulfills this object reliably is of course also possible.

Other objects, advantages and novel features of the present invention will become apparent from the following detailed description of the invention when considered in conjunction with the accompanying drawings.

BRIEF DESCRIPTION OF THE DRAWINGS

FIGS. 1a and 1b are schematic plan views of the bilateral tensioning of the lap belt of a passenger;

FIG. 2 shows a belt tensioning system according to the invention;

DETAILED DESCRIPTION OF THE DRAWINGS

Figure 3:
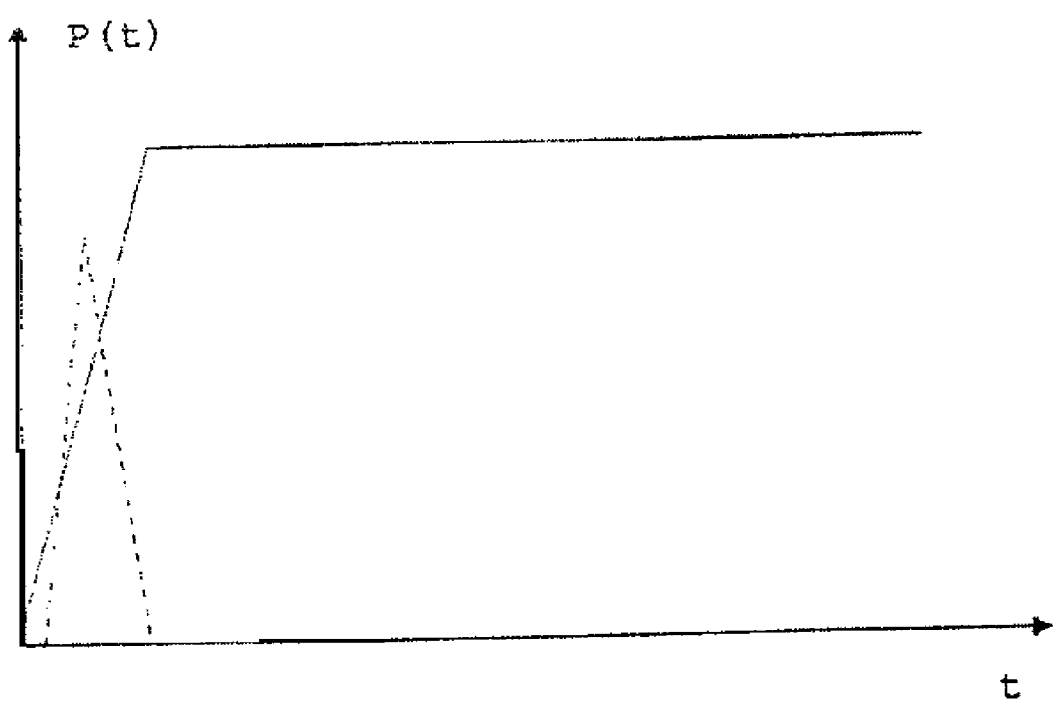
FIG. 3 is a graphic depiction of the temporal pressure course p(t) within the cylinder of a linear tensioner, for both a conventional system and the system according to the invention.

FIGS. 1a and 1b each show a plan view of a vehicle seat 1 with a passenger 2, in a schematic depiction. The vehicle seat comprises a seating area 1.1 and a backrest 1.2. The passenger is secured by a belt strap 3, which forms a lap belt and can be part of a more comprehensive seat belt system. (A shoulder belt which may also be present is not shown.) The lap belt normally extends from an end fitting to a belt lock, to which it is connected by a belt tongue. The arrangement of the belt lock and the belt end fitting depends on whether it is a driver or a passenger seat and on the type of vehicle, and is not shown. The bilateral tensioning takes place by means of two tensioners, e.g., a first tensioner 5 engaging an end fitting, and a second tensioner 6 engaging the belt lock. The tensioning systems are thereby rigidly connected to the vehicle structure and are executed as a linear drive with a symbolically shown piston-cylinder arrangement.

As used herein, the word "cylinder" always means a hollow cylinder. The working chamber in which a propellant expands to drive a piston 5.1, 6.1, is formed by the chamber between the piston and a face of the cylinder, and is closed in a pressure-tight manner, so that pressure for driving the piston can be built up. The other face is formed in a pressure-permeable manner to enable an axial piston movement within the cylinder without counterpressure.

In FIG. 2, the two tensioners are combined and form a bilateral transverse belt tensioning system 7. With a linear drive, a traction element 5.2, 6.2 or traction rope (not shown in FIG. 1, shown in FIG. 2 symbolically as a line) is connected on the one hand while communicating the belt lock or the end fitting with a belt strap end, and on the other hand with an axially displaceble piston 5.1, 6.1 mounted in the cylinder of the tensioning system. In the activated case, the piston 5.1, 6.1 is pressurized with the pressure of an expanding gas in the cylinder, (produced, for example, by a pyrotechnic gas generator), so that the piston is displaced in the cylinder in the direction of the arrow in FIG. 1b, whereby the traction element 5.2, 6.2 is taken along, and consequently a belt connected thereto is tensioned. A resulting withdrawal force on the passenger results, which also points in the direction of the arrow and draws the passenger into the seat. The arrow direction shows only a projection in the horizontal vehicle plane. The force also has a component in the obliquely downward direction in three dimensions, due to the course of the traction means from the belt strap end to the connection or deflection at the seat frame.

The detailed design of a tensioning system is well-known in the state of the art. The construction of any known linear drive used in vehicles can be consulted. Tensioning systems with a rotary drive could also be used.

Tensioners can also be equipped with a force limiter. An element consuming energy ensures that the forces acting on the upper body of the passenger by the belt are limited during the deceleration of the vehicle, by removing force peaks by means of the elements consuming energy. Different types of energy-consuming elements are known e.g., a traction rope, which is drawn through a holder through material widening, an expanding piston, which is displaced through material widening of a cylinder wall, or a torsional wave. The tensioners for use in the present invention may require special measures, so that the force limiter in the passive retaining phase is effective, but does not lead to a limitation of the actively introducible force in the tensioning phase beforehand, which can be above the force limiting level. Such a measure is described in German patent document DE 102006053563, not yet published, for a special type of linear tensioner.

FIG. 3 is a schematic illustration of pressure v. time t in the cylinder of a cylinder-piston unit of a tensioner, where the piston is moved by the gas pressure of an expanding gas. The dotted line shows a typical pressure course in a conventional pyrotechnic linear tensioner used in vehicles. Pressure builds up in the cylinder within a time as short as possible (5-12 ms), so that the belt is retracted with a force of 0.5-2.5 kN, to remove its slack. After the end of the tensioning and at the beginning of the subsequent passive retaining phase, in which the passenger experiences a forward displacement, the piston or the traction element locks, so as to release the belt strap again against the resistance of a force limiting device when the force limiting level is exceeded. With the locking of the piston, the pressure needs not be maintained any more in the piston-cylinder unit. The withdrawal phase is controlled only by the force limiting unit. No special measures are necessary for sealing the pressure, as a pressure loss is negligible due to the short tensioning time. Present-day tensioners are designed in such a manner that the pressure in the cylinder is reduced again quickly after tensioning and locking. The dotted curve in FIG. 2 thereby drops again very quickly after reaching the apex.

In contrast to the state of the art, the force in the belt strap used according to the invention is maintained at a high level over a sustained period between 20-100 ms, starting at an early time after the start ($t\_0$) of the crash. The continuous line shows a corresponding pressure course in the cylinder of a tensioner. The pressure is maintained in the cylinder after a fast increase; the piston does not lock, but draws on the belt for a period of 20-100 ms with a constant force along a retraction path, before a locking with force limitation takes place by the applied withdrawal movement of the retaining phase. It has been shown in simulations and experiments, that the best results can be obtained with two tensioners with respectively a force of 2000-4000 N over a period of 60-80 ms and a belt retraction of 100-200 mm. The level of the force limitation depends on the available pre-displacement path (interior, seat position, passenger weight), the airbag adjustment, and the severity of the crash. The tensioner necessary for the invention thus requires special measures for providing a larger retraction length, special measures for sealing the cylinder chamber to be able to hold a large gas pressure for a time up to 100 ms, and possibly special measures to switch off a force limitation in the initial tensioning phase.

Figure 4A:
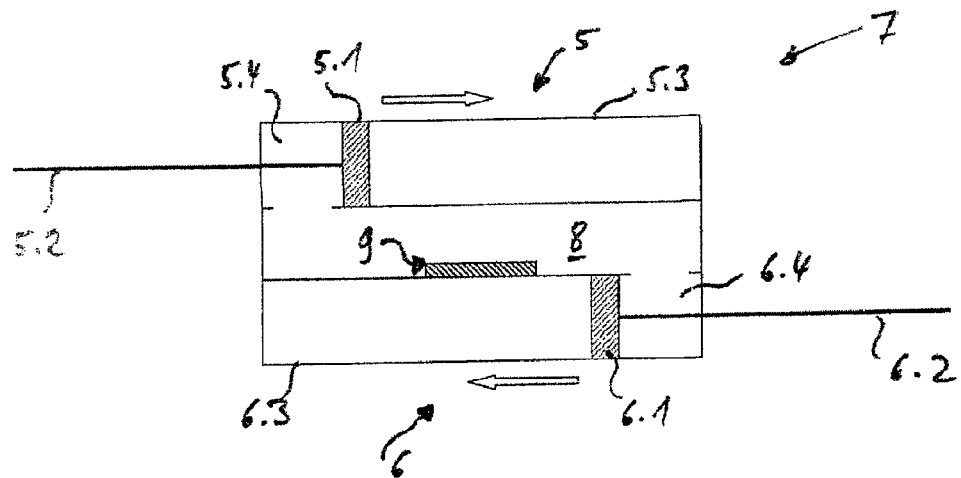
FIGS. 4a and 4b show respective versions of a first integrated belt tensioning system with an equalizing volume.

FIG. 4a shows a further embodiment of the belt tensioner system 7 of FIG. 2, in which equivalent components are designated with the same position sign. The two tensioners 5, 6 are pneumatically connected in such a manner by an equalization volume 8, that a pressure equalization can take place between the two working chambers 5.4 and 6.4. The pressure can be generated by an outer gas generator and introduced into the equalization volume 8, or can be generated by an integrated, e.g., pyrotechnical gas generator 9. Upon ignition, the gas expands in the equalization volume and flows into the two working chambers 5.4, 6.4, displacing the pistons 5.1, 6.1 (which limit the two working chambers) in the direction of the arrows. Both ends of the lap belt are tensioned by the displacement of the pistons 5.1, 6.1 by the traction elements 5.2, 6.2, which are guided through the cylinders 5.3, 6.3 in a pressure-tight manner. If the retraction of the belt strap meets a large resistance on one side (e.g., if hardly any belt slack has to be removed there), no further pressure increase takes place there; the gas which is produced further rather benefits the faster build-up of a pressure in the other cylinder by the equalization volume. The piston is moved there with a larger pressure and can retract the belt strap with a corresponding larger force, as with an arrangement without equalization volume. By the equalization volume, the same force adjusts itself on both sides of the belt tensioner system, so that a passenger is always drawn into a direction of the backrests and seat cushion (drawing obliquely downwards) by the belt lap.

The two working chambers 5.4, 6.4 and the equalization volume 8 can also be integrated into a common working chamber, e.g., when the two tensioners 5, 6 are arranged offset in the axial direction in such a manner that the two working chambers will lie above one another in the vertical direction. Such a belt tensioning system is shown in FIG. 4b, where the gas generator was not depicted.

Figure 4B:
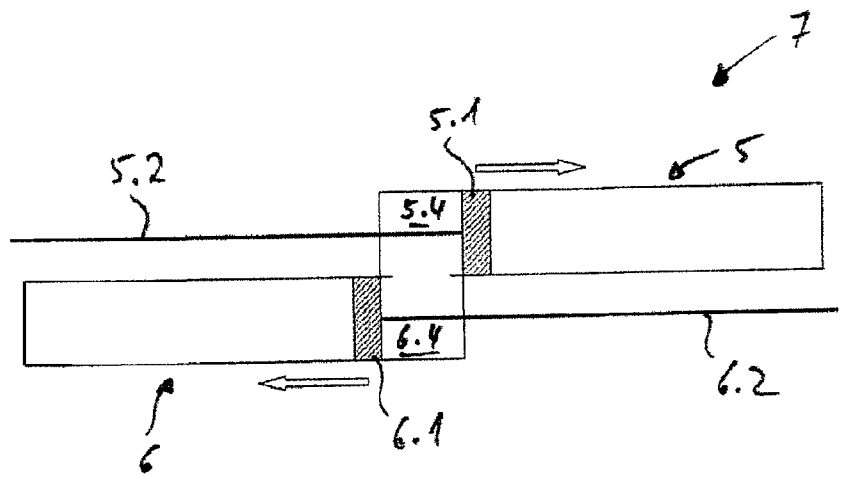

With the belt tensioning system shown in FIGS. 4a, 4b, the retraction path provided per side corresponds to the available displacement path of the piston. If, due to a high counterforce, only short path can be retracted on one side, the retraction path for the other side is no more than the displacement path provided by the cylinder geometry. This disadvantage is avoided with a belt tensioner system 10 according to FIG. 5.

Figure 5A:
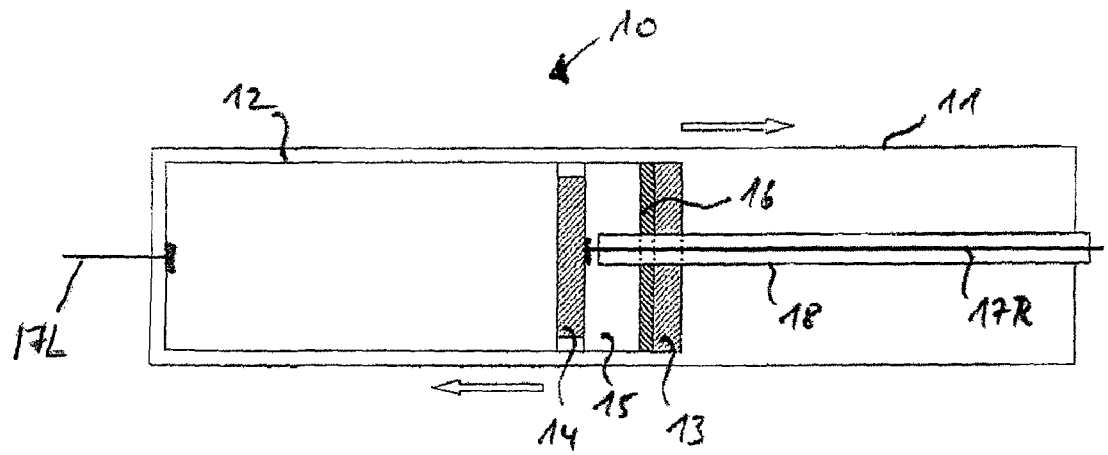
FIG. 5a shows a second integrated belt tensioning system prior to the ignition.

FIG. 5a shows an integrated belt tensioning system 10 with a long outer cylinder 11, approximately double the length of the two tensioners arranged in an anti-parallel manner of the embodiment in FIG. 4a. The outer cylinder 11 of the integrated belt tensioning system can take up a maximum length of 500 mm with an arrangement transverse to the seat, so that a very long total displacement path is available. An inner cylinder 12 is mounted within the outer cylinder 11 with about half the length displaceable in the axial direction. The outer cylinder 11 thereby serves as guide tube for the inner cylinder 12 running therein.

A central working chamber 15 is arranged within the inner cylinder 12, which chamber is limited by a closing outer piston 13 at the end of the inner cylinder 12, and by an axially displaceable inner piston 14 displaceable within the inner cylinder 12. The outer piston 13 is rigidly connected to the inner cylinder 12 at its face and closes this and thereby also the working chamber 15 in a pressure-tight manner. The inner piston 14 closes the working chamber 15 in a pressure-tight manner at the opposite end by means of e.g., an O-ring, so that, even when the inner piston 14 is displaced, no gas can escape into the section of the cylinder lying outside the working chamber 15.

During a crash, gas suddenly flows into the working chamber 15, which charges the two pistons 13, 14 with pressure. The gas can be introduced from the outside, or it can be generated by a gas generator 16 (e.g., a pyrotechnic gas generator), which is arranged in the working chamber 15, and is ignited by an ignition current during a crash. Opposing forces, shown in FIG. 5 as arrows, act on the two pistons 13, 14 with the pressure charge of the two pistons 13, 14.

Figure 5B:
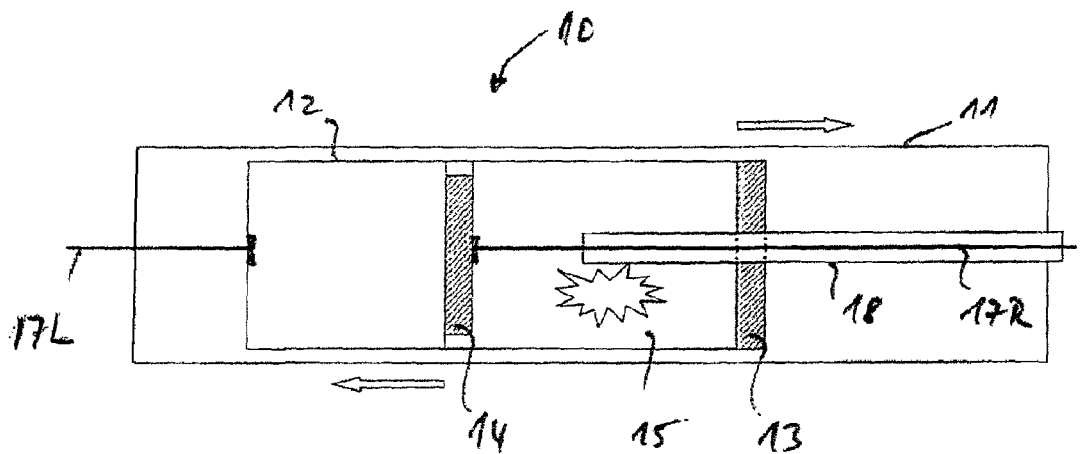
FIG. 5b shows the second integrated belt tensioning system after the ignition.

FIG. 5b shows the integrated belt tensioning system at a time shortly after the ignition of the gas generator (not shown separately), especially as a pyrotechnical layer has burnt down quickly after the ignition. The inner piston 14 is displaced by the expanding gas within the inner cylinder 12 to the outside (that is, in FIG. 5b to the left), while the inner cylinder 12 is displaced in the direction of the force on the outer piston 13 (that is, in the FIG. 5b to the right). The displacement of the pistons 13, 14 is transferred to the belt strap ends by means of two traction elements 17L, 17R, which are guided out on the left and right of the outer cylinder 11 by deflection means, not shown, and acts as a bilateral retracting movement. The left traction element 17L engages the inner cylinder 12; it is thus rigidly connected to the outer piston 13 and is guided out from the outer cylinder 11 on the one (left) side. The right traction element 17R is rigidly connected to the inner piston 14, guided in a pressure-tight but displaceable manner through the outer piston 13, and is guided from the outer cylinder 11 on the other (right) side.

In one embodiment it is provided that the right traction element 17R is guided within a sleeve 18 through the outer piston 13. A movement of the traction element 17R, which is as defined and frictionless as possible can thereby be ensured. The problem of the pressure-tight closure of the working chamber 15 can be solved in a better manner compared to a passage of the traction element 17R through the outer piston 13, as the sleeve can be optimized to the demand of the displaceable sealing. The sleeve is rigidly connected to the outer cylinder 11 at its outer end and is supported through the passage of the outer piston 13 at its inner end.

A gas, an ignition spark, or an ignition line can also be fed via the sleeve 18 of the central working chamber 15. The expanding gas of an external gas generator could particularly be fed to the central working chamber 15 via the sleeve 18. When an inner gas generator 16 is used as shown in FIG. 5a, electrical leads could be guided in the sleeve for igniting the (pyrotechnic) gas generator. Once the ignition has taken place, the electrical ignition wires can afterwards tear without damage during the movement of the pistons 14, 15. So that a sufficient pressure can be built up within the working chamber 15, the sleeve 18 must of course, to be formed in such a manner that pressure cannot escape to the outside via the sleeve 18.

Alternatively, the sleeve 18 can be rigidly connected to the piston 14. The sleeve 18 is then taken along with a movement of the inner piston 14 following the gas explosion and is drawn through the passage of the outer piston. The maximum path of the belt tensioning system can be limited by means of a stop at the sleeve, by limiting the maximum distance between both pistons 13, 14.

The movement of one or both pistons 13, 14 following an outer force on the traction elements 17R, 17L can be braked by the force limiting means within one or the cylinders 11, 12. This is important so as to inhibit force peaks on the passenger in the passive retaining phase by an easing of the belt in a definitive manner, if the force exceeds a threshold. The traction elements 17R, 17L could for example be fixed to the respective piston 13, 14 by a strong spring. Due to the equalization volume, a single force limiting means (e.g., at the piston end of the traction means 17L or 17R) is sufficient, as a force equilibrium always adjusts on the traction elements 17R, 17L.

Further designs are conceivable. Different forces can be provided by different cross sections for cylinder and piston of respectively one side. Different forces adjust with the same pressure due to the different surface. A different tensioning can thus be achieved, for example, at the belt lock and the end fitting.

As the cylinder-piston unit of the belt tensioning system according to the invention is closed in a gas-tight (pressure-tight) manner, a pressure relief valve can be provided for limiting the belt forces. This could be necessary to avoid belt forces that are too high with a low belt slack.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for restraining a vehicle passenger upon occurrence of an accident in the form of an impact of the vehicle with an obstacle, said method comprising:
   detecting a possible accident, and
   a seat belt system exerting upon said passenger a force acting in the direction of impact, at the latest, upon one of i) first contact between the vehicle and the obstacle, and ii) when vehicle deceleration exceeds a threshold value; wherein,
   the force is introduced by bilateral tensioning of a lap belt of a seat belt system;
   said lap belt is tensioned from both sides with a retaining force of at least 2000-4500 N; and
   said retaining force is maintained for a retaining phase of at least 20 ms along a displacement path of the passenger.

2. The method for according to claim 1, wherein:
   a shoulder belt of the safety belt system is tensioned before or simultaneously with tensioning of the lap belt; and
   a force introduced into the shoulder belt is limited to a size that is sufficient to remove slack in the shoulder belt.

3. The method according to claim 1, wherein, if an impact direction deviates from a longitudinal vehicle direction, a force that deviates from the vehicle longitudinal direction is applied to the passenger, with a time delay in the tensioning of both sides of the lap belt.

4. A belt tensioning system for tensioning a lap belt which is connected at one end to an end fitting and at an opposite end is connected to a belt lock by a belt tongue; said belt tensioning system comprising:
   a first tensioner which is in operative connection with the end fitting; and
   a second tensioner which is in operative connection with the belt lock; wherein,
   said first and second tensioners are formed with regard to a maximum retraction path in such a manner that an achieved force level can be maintained along the retraction path over a retaining phase of at least 20 ms, wherein:
   the tensioners are linear tensioners each having a respective one cylinder-piston unit;
   pistons of the cylinder-piston units are moved by a gas expanding in a working chamber; and
   the working chambers of the respective piston units are connected pneumatically by an equalization volume.

5. The belt tensioning system according to claim 4, wherein the belt tensioning system is arranged under a seat.

6. The belt tensioning system according to claim 4, wherein the expanding gas is generated by a common gas generator.

7. A belt tensioning system for tensioning a lap belt which is connected at one end to an end fitting and at an opposite end is connected to a belt lock by a belt tongue; said belt tensioning system comprising:
   a first tensioner which is in operative connection with the end fitting;
   a second tensioner which is in operative connection with the belt lock, wherein said first and second tensioners are formed with regard to a maximum retraction path in such a manner that an achieved force level can be maintained along the retraction path over a retaining phase of at least 20 ms; and
   first and second traction elements for tensioning both ends of the lap belt, wherein the first traction elements is guided out from one face of the outer cylinder, the second traction element is guided out from an opposite face of the outer cylinder, and the traction elements are retracted into the outer cylinder when the belt tensioning system is activated, and the traction elements within the outer cylinder are connected to respective pistons, which are charged with the pressure of an expanding gas in a common working chamber when the belt tensioning system is activated, and are accelerated in the opposite directions.

8. The belt tensioning system according to claim 7, wherein:
   the first traction element is connected to an outer piston by an inner cylinder displaceable in the outer cylinder; and
   the second traction element is guided in an axially displaceable manner through the outer piston, and is connected to an inner piston, which is displaceable within the inner cylinder.

* * * * *